United States Patent [19]
Zydek et al.

[11] Patent Number: 6,115,832
[45] Date of Patent: Sep. 5, 2000

[54] PROCESS AND CIRCUITRY FOR MONITORING A DATA PROCESSING CIRCUIT

[75] Inventors: Michael Zydek, Langgöns; Olaf Zinke, Hofheim; Wolfgang Fey, Niedernhausen; Mario Engelmann, Steinbach, all of Germany

[73] Assignee: ITT Manufacturing Enterprises, Inc., Wilmington, Del.

[21] Appl. No.: 08/913,424

[22] PCT Filed: Feb. 21, 1996

[86] PCT No.: PCT/EP96/00704

§ 371 Date: Nov. 24, 1997

§ 102(e) Date: Nov. 24, 1997

[87] PCT Pub. No.: WO96/30775

PCT Pub. Date: Oct. 3, 1996

[30] Foreign Application Priority Data

Mar. 31, 1995 [DE] Germany ............... 195 11 842

[51] Int. Cl.$^7$ .............. G06F 11/30; H04B 17/00
[52] U.S. Cl. .................. 714/47; 717/6; 714/11
[58] Field of Search ............... 714/38, 37, 47, 714/49, 48, 45, 10, 11, 12; 395/703, 704, 705, 706, 708; 717/3, 4, 5, 6, 8

[56] References Cited

U.S. PATENT DOCUMENTS

| | | | |
|---|---|---|---|
| 3,810,119 | 5/1974 | Zieve et al. | 714/12 |
| 3,891,279 | 6/1975 | Frait . | |
| 4,030,074 | 6/1977 | Giorcelli | 714/37 |
| 5,029,071 | 7/1991 | Kinsohita | 714/11 |
| 5,440,724 | 8/1995 | Boothroyd et al. | 714/724 |

FOREIGN PATENT DOCUMENTS

| | | |
|---|---|---|
| 496509 | 7/1992 | European Pat. Off. . |
| 645711 | 3/1995 | European Pat. Off. . |
| 2534904 | 9/1979 | Germany . |
| 3731097 | 3/1989 | Germany . |
| 4101598 | 8/1991 | Germany . |
| 4326919 | 2/1995 | Germany . |
| 40-6161798 | 6/1994 | Japan .............. G06F 11/18 |

OTHER PUBLICATIONS

Saisho et al, "The architecture of OCMP and its evaluation," Parallel Architectures, Algorithms, and Networks, pp. 71–77, 1997.

Kwentus et al, "A programmable digital fitler IC employing multiple processors on a single chip," Circuits and Systems for Video Technology, pp. 231–244, Jun. 1992.

*Primary Examiner*—Robert W. Beausoliel, Jr.
*Assistant Examiner*—Christopher Revak
*Attorney, Agent, or Firm*—Rader, Fishman & Grauer PLLC

[57] ABSTRACT

To monitor a data processing circuit which includes two (or a plurality of) microprocessors or other data processing systems which are mounted on a joint chip and connected by data lines, the microprocessors jointly produce data words which form a data word sequence and are transmitted to a monitoring circuit at predetermined times. The monitoring circuit is arranged on a separate chip. The data words of the data word sequence are checked by the monitoring circuit with respect to the contents and time of appearance of the individual data words. It is favorable to make up the individual data words of partwords which are produced according to different algorithms.

32 Claims, 3 Drawing Sheets

PROCESS AND CIRCUITRY FOR MONITORING A DATA PROCESSING CIRCUIT

BACKGROUND OF THE INVENTION

The present invention relates to a method of monitoring a data processing circuit which includes two or a plurality of data processing systems such as microprocessors, microcomputers, or the like, which are mounted on a joint chip and connected by data lines. Circuitries for implementing the method are also comprised by the present invention.

The proper, fail-free operation of data processing circuits, comprising microprocessors, microcomputers and other programmed circuit systems, must be monitored, as is known in the art. This applies especially when the circuits form part of safety-critical control systems. One example of a safety-critical application is the controlling intervention in the brake system of an automotive vehicle, for example, for anti-lock control purposes, for traction slip control or driving stability control. When a malfunction of the data processing circuit is detected, the control is deactivated or changed over to a mode of operation which is still possible despite the error occurred, and is less critical in safety respects.

It is important for such monitoring actions that the malfunction is detected quickly and with a high degree of reliability. To achieve this object, in a control circuit disclosed in German patent No. 32 34 637 (P 5248), the input data produced in wheel sensors are processed in two parallel, identically designed and identically programmed microcontrollers which are independent of each other. The output signals of the two microcontrollers are then checked for correlation. When differences indicative of a malfunction arise, the electronic control is disabled, and brake functioning is thereby maintained. Thus, the prior art control circuit is based on redundant data processing in two complete systems, and the sole purpose of the redundance is to identify occurring errors with a high degree of reliability so that the control system can be disabled in this case. The monitoring circuit for identifying and evaluating arising differences and the deactivation electronics also have a virtually redundant design. Thus, greater complexity must be tolerated for saftey reasons.

Further, German patent application No. 41 37 124 discloses a circuitry wherein the input signals are processed in two parallel microcontrollers which have a different design and program, however. Only one of the two microcontrollers performs the complete, complicated signal processing operation. The second microcontroller is mainly used for monitoring, for what purpose the input signals, after being conditioned and after time derivatives are produced, are further processed on the basis of simplified control algorithms and a simplified control philosophy. In comparison to the above mentioned prior art circuit, the complexity is reduced by the simplified data processing operation in the monitoring microcontroller.

Nowadays, it is in principle also possible to accommodate a plurality of complete data processing systems, for example, two microcomputers, on one single chip, to furnish both microcomputers with the same input data and to compare the data processing results of both systems for checking the proper operation of the systems. However, when the electronic systems are constructively linked in this fashion, it cannot be ruled out with a sufficiently high degree of reliability that, with defined circuit defects or a malfunction having equal effect on both systems, a correct monitoring signal will be produced even if an error exists.

A sufficiently reliable detection of malfunctions cannot be expected at all in a circuit based on one single data processing system in connection with a monitoring operation of the conventional type.

Finally, German patent application No. 40 04 782 discloses an anti-lock system having two microcontrollers which both generate a monitoring signal that represents an alternating signal with a predetermined frequency and a predetermined variation. A safety circuit compares the alternating signals with a time standard derived from a clock generator which is independent of the working clock of the microcontroller. A variation of the alternating signal as well as failure of the time standard leads to a deactivation of the anti-lock control. The control is disabled when the pulses drop from the predetermined time window. This circuit is also based on using two microcontrollers of redundant operation.

An object of the present invention is to monitor a data processing circuit comprising two or a plurality of processors mounted on one single chip, or other data processing systems and to achieve that malfunctions are detected and signalled with a high degree of safety and reliability. Further, the expenditure required to achieve the present method and the corresponding circuit should be minimized.

SUMMARY OF THE INVENTION

It has been found that this object can be achieved by a method including that the data processing systems jointly produce data words and a data word sequence which are transmitted at predetermined times to a monitoring circuit that is mounted on a separate chip, and are checked by the monitoring circuit with respect to the contents and the time of occurrence of the individual data words.

In a preferred aspect of the present invention, parts of the individual data words which produce the data word sequence are generated in the data processing systems, and the partwords are put together in one of the data processing systems to the complete word which, as a whole, is then transmitted to the monitoring circuit.

Safety is considerably enhanced because the partwords are produced according to different algorithms in the individual data processing systems. In a malfunction having effect on all data processing systems, it cannot be expected that correct partwords are produced which, after being put together, would provide the correct data word.

It has been found to be particularly appropriate that the individual words of the data word sequence are checked for correlation with respect to contents and time with words generated in the monitoring circuit, and that an error detection signal and/or deactivation signal is triggered when differences arise, or when the differences exceed predetermined limit values. Small timing differences are tolerable, for example.

Appropriately, partwords are also produced in the monitoring circuit and put together to complete words, and the partwords in turn can be generated according to different algorithms.

According to another aspect of the present invention, the individual data words have a length of 8 bit and are composed of two partwords of equal length each. According to still another aspect of the present invention, the partwords are produced in the monitoring circuit by hardware, i.e. by mask-programmed circuit technology, and in the data processing systems by software, i.e. by a corresponding programming. One of the partwords is produced according to the relation (Gl.1)

$WD_{n+1}(3)$ from $WD_n(2)$
$WD_{n+1}(2)$ from $WD_n(1)$
$WD_{n+1}(1)$ from $WD_n(0)$
$WD_{n+1}(0)$ from $[WD_{n-1}(3) \text{ XOR } WD_n(1)] \text{ XOR } WD_n(0)$
and the other partword is produced according to the relation (Gl.2)

$WD_{n+1}(3)$ from $WD_n(2)$
$WD_{n+1}(2)$ from $WD_n(1)$
$WD_{n+1}(1)$ from $WD_n(0)$
$WD_{n+1}(0)$ from $WD_n(3) \text{ XOR } WD_n(2)$ wherein
(0 . . . 3) . . . is the respective place of the 4-bit partword,
n . . . is the point of time in the working clock,
XOR . . . is the logic linking "exclusive OR", and
from . . . implies "results from".

According to one prferred embodiment of a circuitry, two integrated circuits, each representing a complete data processing system and being interconnected by data lines, are mounted on one joint chip, and one partword is produced in each of the two data processing systems. One system will then take care of joining the partwords to a complete data word, and of transmitting it to the monitoring circuit. The other data processing system performs the control of the word transmission to the monitoring circuit. This "task sharing" further increases the circuit safety on the basis of the monitoring concept according to the present invention.

Further features, advantages and possible applications of the present invention can be seen in the following description of details by way of embodiments of the present invention.

BRIEF DESCRIPTION OF THE DRAWINGS

In the drawings,

FIG. 2A is the variation of a signal at the input of the monitoring circuit.

DETAILED DESCRIPTION OF THE DRAWINGS

Figure 1:
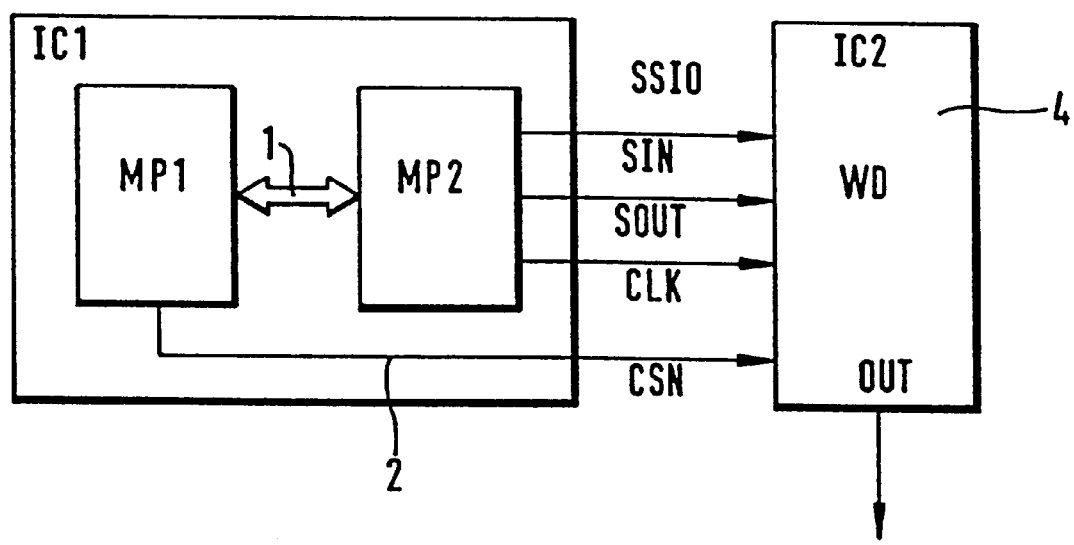
FIG. 1 is a schematic view of t he basic design of a circuitry of the present invention.

FIG. 1 is used to explain the monitoring concept on which the present invention is based. In this embodiment, two complete microprocessors MP1, MP2, microcomputers or other data processing systems are mounted on a silicon chip IC1. The microprocessors can be the two microprocessors in the electronic part of an automotive vehicle control system, such as an anti-lock control system (ABS), traction slip control system (TCS) or a driving stability control system (DSC). The two processors or data processing systems MP1, MP2 are interconnected by data lines 1. A monitoring circuit 4, referred to as "watchdog" (WD) is connected to one of the two processors (in this case to processor MP2) by a serial interface SSIO. An output "OUT" leads to a safety switch which deactivates the control, changes it over, and/or issues an error detection signal when the monitoring circuit identifies an error.

Finally, FIG. 1 shows a signal line CSN which extends from the data processing system MP1 to the monitoring circuit 4. Signal line CSN is used to control the transmission of the data from the processor MP2 to the monitoring circuit 4 which will be explained in detail in the following.

Illustrated and described are only those measures and circuit parts provided to monitor the proper operation of the two processors MP1, MP2. The steps required for the actual data processing operation are not shown.

According to the present invention, the two microprocessors MP1, MP2 produce data words and a data word sequence for monitoring purposes which are transmitted to the monitoring circuit 4 and are checked for correlation with a predetermined data word sequence or with the individual data words. Both the correlation of the individual data words with respect to the contents and timing of the individual data words is monitored. When differences occur, or when the differences exceed predetermined limit values, this is assessed as an error and signalled by way of output OUT.

According to the present invention, the individual words of the data word sequence are generated by producing partwords which are then joined to complete words. This joining action is effected in the microprocessors MP1, MP2 by software or corresponding programming of the microprocessors. The corresponding data word is produced in the monitoring circuit 4 by hard-wired circuit electronics, as will be described hereinbelow by way of FIG. 3.

The individual data words have a length of 8 bit in the present embodiment. The data words are composed of two partwords of 4 bit each. The partwords are produced in the microprocessors MP1, MP2. According to FIG. 1, a microprocessor, i.e. microprocessor MP2, takes care of joining the two partwords and transmitting the complete word to the monitoring circuit 4 by way of the serial interface SSIO. The other microprocessor, i.e. MP1, which does not participate in joining the partwords, governs the transmission of the complete words from the microprocessor MP2 to the monitoring circuit 4 by way of signal line 2 CSN (chip-select, N=low-active). A complete data word is produced and transmitted in each working clock which may be in the order of 7 msec. Another data word follows in the next clock. In the present case, which will still be explained, the word sequence includes 210 different words in an endless sequence.

The two partwords produced in the processors MP1, MP2 are generated on the basis of different algorithms according to the present invention. This is very important for the safety or error detectability when applying the method of the present invention.

Data words are produced as follows:

In the embodiment of FIG. 1, initially, a data word half is produced in each processor MP1, MP2 by read access to its program memory. The word half produced in the microprocessor MP1 is now transmitted by the parallel data connection 1 to the microprocessor MP2 and joined therein to a complete data word. When the microprocessor MP2 makes a mistake in joining the word halves, the complete data word would be wrong. The production of the data word is completed. The word is now transmitted to the monitoring circuit 4, mounted on a separate chip (IC2), at the exact point of time, for example upon expiry of a working clock, by way of the serial interface SSIO. The data word is delegated to a shift register of the monitoring circuit 4. The transmission is effected as soon as signal CSN is applied to line 2. CSN is the signal releasing the shift register in the monitoring circuit 4.

In the embodiment of FIG. 1, the microprocessor MP2 determines the transmission of a correct word, or its contents, and microprocessor MP1 determines the timing, i.e. the transmission at the proper time. The transmitted word is compared with the predetermined word for correlation in the monitoring circuit 4. In the presence of proper correlation, change-over to the next word is made in each clock which is then assessed in a predetermined time window.

It is, of course, also possible that the microprocessor MP2 handles the complete transmission, including CSN. However, this would reduce the safety of error detection.

Figure 2:
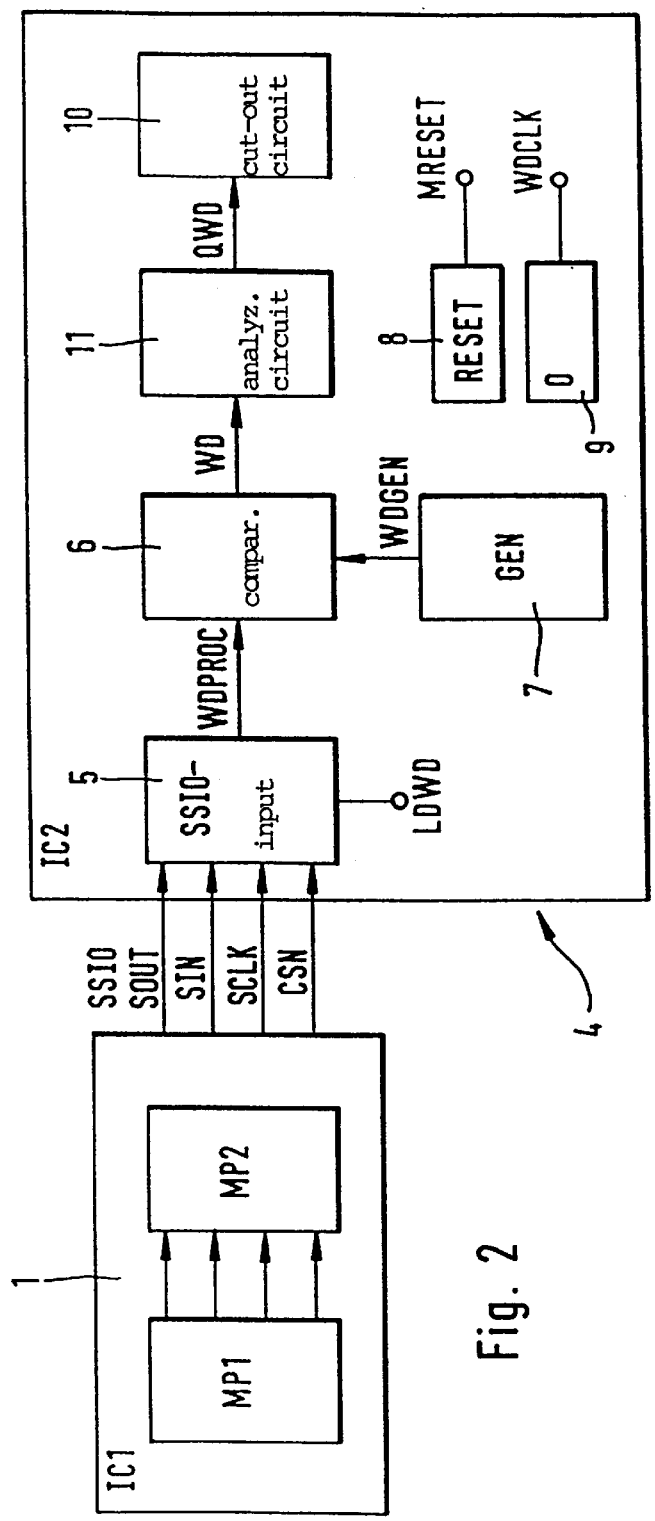
FIG. 2 is a schematic view of the circuitry of FIG. 1 including further details of the monitoring circuit.

The assembly groups being part of the monitoring circuit 4 and mounted on the joint chip IC2 are shown in FIG. 2. The data words of the data word sequence jointly produced in the microprocessors MP1, MP2 are transmitted by the serial interface to the shift register and the intermediate memory forming part of the SSIO input 5. In a comparator 6, the individual data words WDPROC are compared with the predetermined words WDGEN which are produced in the monitoring circuit 4 by the generator (GEN) 7. A circuit 8 for producing the RESET signals and an oscillator and divider 9 for producing the working clock WDCLK are also shown.

Data words which result in the predetermined data word sequence are produced in the monitoring circuit 4 (IC2) by way of a hard-wired logic circuit. The data words are then compared for correlation with data words and a data word sequence produced by software in the microprocessors MP1, P2 and transmitted to circuit 4. The comparison result (WD) is assessed by an analyzing circuit 11. A circuit 10 includes a so-called safety cut-out.

Figure 3:
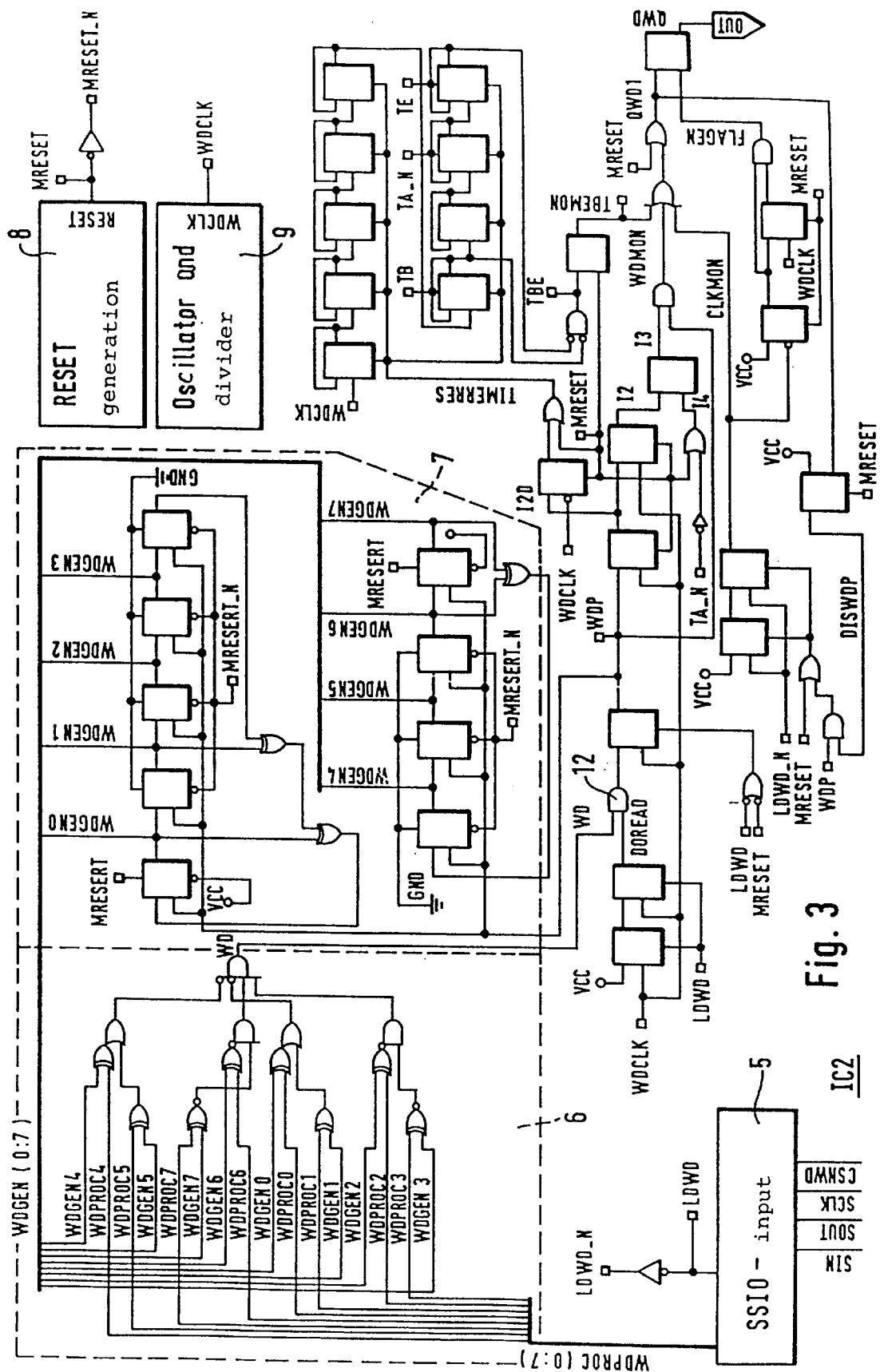
FIG. 3 is an embodiment of the monitoring circuit of FIG. 2.

FIG. 3 explains in detail an embodiment of the monitoring circuit 4 of FIGS. 1 and 2. In detail, the design and operation is as follows:

The data words or watchdog words produced in the processor circuit (IC1) are transmitted to the input 5 of the monitoring circuit 4 in defined intervals, i.e. in the working clock, by way of the serial interface SSIO (lines: SIN, SOUT, SCK, CSN). The data prevailing at connection SIN are shifted into the input shift register of the input circuit 5 by way of clock SCLK. With the leading flank of the low-active CSN signal, the data in the input shift register are written in an intermediate memory, which is also comprised in the input circuit 5, and are then available for assessment as 8-bit data word WDRPOC(0:7) on a bus. The signal LDWD provided by the input circuit 5 results from the signals CSNWD and SCLK in the manner shown in FIG. 2A.

The data word WDPROC(0:7) originating from the microprocessors MP1, MP2 is now compared with the data word WDGEN(0:7) generated in the monitoring circuit 4 by way of the comparator 6. The signal WD at the output of the comparator 6 is '1' when both data words are equal.

The 8-bit data word as well as the data word produced by processors MP1, MP2 or in the chip IC1 is made up in the monitoring circuit 4 of two partwords which each have a width of 4 bit. The first of the partwords WDGEN(0:3) produced in the monitoring circuit 4 is generated by the top five flipflops and the second partword WDGEN(4:7) is generated by the underlying four flipflops and the respective exclusive OR feedbacks. This watchdog generator is clocked with a pulse WDP and generates with each leading clock flank a new data word in dependence on the present data word. The type of feedback determines the words of the word sequence and the length of the word sequence. In the present embodiment, the word sequence of the first partword is made up of 14 different 4-bit words, and the length of the second partword is made up of 15 different 4-bit words. These watchdog generator words WDGEN are produced according to the algorithms indicated hereinbelow. For the first partword WDGEN/0:3), the relation Gl.1 applies:

$WD_{n+1}(3)$ from $WD_n(2)$
$WD_{n+1}(2)$ from $WD_n(1)$
$WD_{n+1}(1)$ from $WD_n(0)$
$WD_{n+1}(0)$ from $[WD_{n-1}(3)$ XOR $WD_n(1)]$ XOR $WD_n(0)$
and for the other partword the relation Gl.2 applies:
$WD_{n+1}(3)$ from $WD_n(2)$
$WD_{n+1}(2)$ from $WD_n(1)$
$WD_{n+1}(1)$ from $WD_n(0)$
$WD_{n+1}(0)$ from $WD_n(3)$ XOR $WD_n(2)$.

The abbreviations have the following meaning:
WD=WDGEN=watchdog data word, generated by the generator GEN,
(0 . . . 3) . . . is the respective place of the 4-bit partword,
n . . . is the point of time in the working clock,
XOR . . . is the logic linking "exclusive OR", and
from . . . implies "results from".

The algorithms (Gl. 1, Gl. 2) for the production of the two partwords, hence, are different from each other. The provision of the complete word by joining the two partwords, which each produce a word sequence of 14 different or 15 different 4-bit words in total, results in an endless sequence of 210 different 8-bit data words composed of the 4-bit partwords. This is illustrated in the following table:

Initial word (1): 1 000 0001

TABLE

| data word No. | partword acc. to G1.1 | partword acc. to G1.2 | complete word; word sequence |
|---|---|---|---|
| (1) | (1) 1000 | (1) 0001 | 10000001 |
| (2) | (2) 1100 | (2) 1000 | 11001000 |
| (3) | (3) 0110 | (3) 0100 | 01100100 |
| . | . | . | . |
| . | . | . | . |
| . | . | . | . |
| (14) | (14) 0000 | (14) 0111 | 00000111 |
| (15) | (1) 1000 | (15) 0011 | 10000011 |
| (16) | (2) 1100 | (1) 0001 | 11000001 |
| (17) | (3) 0110 | (2) 1000 | 01101000 |
| . | . | . | . |
| . | . | . | . |
| . | . | . | . |
| (28) | (14) 0000 | (13) 1111 | 00001111 |
| (29) | (1) 1000 | (14) 0111 | 10000111 |
| (30) | (2) 1100 | (15) 0011 | 11000011 |
| (31) | (3) 0110 | (1) 0001 | 01100001 |
| . | . | . | . |
| . | . | . | . |
| . | . | . | . |
| (209) | (13) 0001 | (14) 0111 | 00010111 |
| (210) | (14) 0000 | (15) 0011 | 00000011 |
| (211) | (1) 1000 | (1) 0001 | 10000001 |
| (212) | (2) 1100 | (2) 1000 | 11001000 |
| . | . | . | . |
| . | . | . | . |
| . | . | . | . |

For this endless sequence of 210 different data words the relation $W_n = W_{(n+m \cdot 210)}$ $W_n$=nth word of the 8-bit data word sequence
n,m=natural numbers 1, 2, 3 . . . applies.

The flipflops of the watchdog generator are occupied with the initial word of the word sequence '1000 0001' during the reset operation.

After an interval of 1 to 2 periods of the working clock WDCLK of monitoring circuit 4, the signal DOREAD at the input of an AND gate 12 becomes '1' after a leading flank of the signal LDWD supplied by the input circuit 5. The result is that the comparison made in circuit 6 of the data word (WDPROC(1:7)) supplied by the processors with the data word (WDGEN(1:7)) generated in the monitoring circuit or the comparison result WD is evaluated. WDP will be set accordingly with the next leading flank of the clock WDCLK. WDP becomes '1' in the event of correlation of both data words. The watchdog generator switches over to the next watchdog word due to the resulting 0–1 flank of the WDP signal. WDPROC(0:7) is still on the previous word at this time. Thus, WD becomes '0'. WDP becomes '0' again with the next leading flank of the clock WDCLK. Thus, WDP is '1' exactly for a period of the clock WDCLK.

A time window for the watchdog pulse WDCLK is defined by signals TB, TA_N and TE. These three signals are generated by way of a 9-step timer which is clocked with WDCLK. The signal TIMERRES resets the timer (TB='1', TA_N='1', TE='1'). The start of the time window is reached as soon as TAN becomes '0' for the first time. In consideration of the fact that the signal TIMERRES is released synchronously with the trailing flank of the pulse WDCLK (i.e. becomes '0'), this condition occurs after exactly 127.5 WDCLK pulses. The end of the time window is reached as soon as TBE becomes '1' for the first time (after 287.5 WDCLK pulses).

After the reset (signal MRESET) of the entire watchdog or monitoring circuit, the signal QWD is zero at the output of the analyzing circuit 11, i.e. QWD='0'. A safety switch will adopt its position "disabled" or "error detected" by way of output OUT. Only after the second watchdog signal or the second data word has been transmitted correctly will QWD be switched to '1' by a '1' at signal FLAGEN.

The signal I2 is '0' after the reset. Thus, the RS flipflop arranged between I2 and I3 is set to '0' on the output side. Detection of a premature watchdog pulse WDP is disabled this way. This means that the first watchdog word or data word may be sent immediately after the reset. The start of the time window as well as the end of the time window is relevant for all following data words because the RS flipflop was set to '1' by the preceding watchdog pulse WDP and is reset to '0' only when the time window start is reached. When a watchdog pulse WDP comes too early, i.e. while I3='1', QWD1 becomes '1', with the result that QWD is set to '0' which, in turn, means "safety cut-out" or "error detection".

When the watchdog words or data words are constantly sent correctly according to the predetermined time window, the signal TBE will never become '1' because the timer is in each case reset again by the watchdog pulse WDP before the time window end is reached. If, however, the end of the time window is exceeded, TBE becomes '1' and the subsequent RS flipflop is set thereby. '1' at TBEMON causes resetting of the output flipflop. Consequently, the output signal QWD becomes '0', and the safety cut-out is triggered.

A wrong watchdog word or data word does not cause a watchdog pulse WDP. In this case, error detection and safety cut-out occurs in response to the time when the wrong data word is sent and depending on whether the wrong data word is still followed by a correct data word within the time window. The following examples explain this condition.

EXAMPLE 1

A wrong data word is sent inbetween two correct data words, and the second data word is transmitted still before the end of the time window (TBE='1'). In this case, the signal CLKMON adopts the value '1' with the trailing flank of the chip-select signal CSNWD pertaining to the second data word. The output flipflop is reset thereby.

EXAMPLE 2

No correct data word is sent in this case until the time window end (TBE='1') is reached. Because the wrong data word does not produce a watchdog pulse WDP, the output TBEMON adopts the value '1'. Therefore, error detection or safety cut-out occurs due to this timeout.

Thus, according to the present invention, the data words are checked in the monitoring circuit both with respect to their correct contents and their timing.

What is claimed is:

1. A method of monitoring a data processing circuit which includes at least two data processing systems, which are mounted on a joint chip and connected by data lines, wherein the data processing systems jointly produce data words and a data word sequence which are transmitted at predetermined times to a monitoring circuit that is mounted on a separate chip, and are checked by the monitoring circuit with respect to the contents and time of appearance of the individual data words wherein parts of the individual data words of the data word sequence are produced in each of the data processing systems, wherein the partwords are put together in one of the data processing systems to a complete word, as a whole, and the other data processing system governs the transmission of the complete data word, from the processing system which joins the words to the monitoring circuit wherein the partwords are produced according to different algorithms in the data processing systems.

2. The method as claimed in claim 1, wherein the individual words of the data word sequence are checked for correlation with respect to contents and time with words generated in the monitoring circuit, and wherein an error detection signal and/or deactivation signal is triggered when differences exceeding a predetermined limit value occur.

3. The method as claimed in claim 1, wherein partwords are produced in the monitoring circuit and put together to complete words.

4. The method as claimed in claim 3, wherein the partwords are generated in the monitoring circuit irrespective of each other according to different algorithms.

5. The method as claimed in claim 1, wherein the partwords and data word sequences are produced in the data processing systems by programming the data processing systems and are produced in the monitoring circuit by hard-wired electronic circuits.

6. The method as claimed in claim 1, wherein the individual data words of the word sequences have a length of 8 bit and are composed of two partwords of equal length each.

7. The mathod as claimed in claim 6, wherein, in the monitoring circuit and by means of the data processing systems, one of the partwords is produced according to the relation $WD_{n+1}(3)$ from $WD_n(2)$
$WD_{n+1}(2)$ from $WD_n(1)$
$WD_{n+1}(1)$ from $WD_n(0)$
$WD_{n+1}(0)$ from $[WD_{n-1}(3)\ XOR\ WD_n(1)]\ XOR\ WD_n(0)$ and the other partword is produced according to the relation $WD_{n+1}(3)$ from $WD_n(2)$
$WD_{n+1}(2)$ from $WD_n(1)$
$WD_{n+1}(1)$ from $WD_n(0)$
$WD_{n+1}(0)$ from $WD_n(3)\ XOR\ WD_n(2)$ wherein
(0 . . . 3) . . . is the respective place of the 4-bit partword,
n . . . is the point of time in the working clock,
XOR . . . is the logic linking "exclusive OR", and
from . . . implies "results from".

8. Circuitry as claimed in claim 1, wherein the monitoring circuit is configured as a hard-wired logic circuit capable of producing the partwords on the basis of different algorithms, of joining the partwords to complete data words and comparing them with the individual words of the data word sequence produced in the data processing systems.

9. A method of monitoring a data processing circuit which includes at least two data processing systems, which are mounted on a joint chip and connected by data lines, wherein the data processing systems jointly produces data words and a data word sequence which are transmitted at predetermined times to a monitoring circuit that is mounted on a separate chip, and are checked by the monitoring circuit with respect to the contents and time of appearance of the individual data words wherein parts of the individual data words of the data word sequence are produced in each of the data processing systems, wherein the partwords are put together in one of the data processing systems to complete a word as a whole, and the other data processing system governs the transmission of the complete data word, from the data processing system which joins the part words to the monitoring circuit, wherein partwords are produced in the monitoring circuit and put together to complete words.

10. The method as claimed in claim 9, wherein the partwords are produced according to different algorithms in the data processing systems.

11. The method as claimed in claim 9, wherein the individual words of the data word sequence are checked for correlation with respect to contents and time with words generated in the monitoring circuit, and wherein an error detection signal and/or deactivation signal is triggered when differences exceeding a predetermined limit value occur.

12. The method as claimed in claim 9, wherein the partwords are generated in the monitoring circuit irrespective of each other according to different algorithms.

13. The method as claimed in claim 9, wherein the partwords and data word sequences are produced in the data processing systems by programming the data processing systems and are produced in the monitoring circuit by hard-wired electronic circuits.

14. The method as claimed in claim 9, wherein the individual data words of the word sequences have a length of 8 bit and are composed of two partwords of equal length each.

15. The method as claimed in claim 14, wherein, in the monitoring circuit and by means of the data processing systems, one of the partwords is produced according to the relation $WD_{n+1}(3)$ from $WD_n(2)$
$WD_{n+1}(2)$ from $WD_n(1)$
$WD_{n+1}(1)$ from $WD_n(0)$
$WD_{n+1}(0)$ from $[WD_{n-1}(3)$ XOR $WD_n(1)]$ XOR $WD_n(0)$
And the other partword is produced according to the relation
$WD_{n+1}(3)$ from $WD_n(2)$
$WD_{n+1}(2)$ from $WD_n(1)$
$WD_{n+1}(1)$ from $WD_n(0)$
$WD_{n+1}(0)$ from $WD_n(3)$ XOR $WD_n(2)$
wherein
(0 . . . 3) . . . is the respective place of the 4-bit partword,
n . . . is the point of time in the working clock,
XOR . . . is the logic linking "exclusive OR", and
From . . . Implies "results from".

16. Circuitry as claimed in claim 9, wherein the monitoring circuit is configured as a hard-wired logic circuit capable of producing the partwords on the basis of different algorithms, of joining the partwords to complete data words and comparing them with the individual words of the data word sequence produced in the data processing systems.

17. A method of monitoring a data processing circuit which includes at least two data processing systems, which are mounted on a joint chip and connected by data lines, wherein the data processing systems jointly produces data words and a data word sequence which are transmitted at predetermined times to a monitoring circuit that is mounted on a separate chip, and are checked by the monitoring circuit with respect to the contents and time of appearance of the individual data words wherein parts of the individual data words of the data word sequence are produced in each of the data processing systems, wherein the partwords are put together in one of the data processing systems to complete a word as a whole, and the other data processing system governs the transmission of the complete data word, from the data processing system which joins the part words to the monitoring circuit, wherein the individual data words of the word sequences have a length of 8 bit and are composed of two partwords of equal length each wherein, in the monitoring circuit and by means of the data processing systems, one of the partwords is produced according to the relation $WD_{n+1}(3)$ from $WD_n(2)$
$WD_{n+1}(2)$ from $WD_n(1)$
$WD_{n+1}(1)$ from $WD_n(0)$
$WD_{n+1}(0)$ from $[WD_{n-1}(3)$ XOR $WD_n(1)]$ XOR $WD_n(0)$
And the other partword is produced according to the relation
$WD_{n+1}(3)$ from $WD_n(2)$
$WD_{n+1}(2)$ from $WD_n(1)$
$WD_{n+1}(1)$ from $WD_n(0)$
$WD_{n+1}(0)$ from $WD_n(3)$ XOR $WD_n(2)$
wherein
(0 . . . 3) . . . is the respective place of the 4-bit partword,
n . . . is the point of time in the working clock,
XOR . . . is the logic linking "exclusive OR", and
From . . . Implies "results from".

18. The method as claimed in claim 17, wherein the partwords are produced according to different algorithms in the data processing systems.

19. The method as claimed in claim 17, wherein the individual words of the data word sequence are checked for correlation with respect to contents and time with words generated in the monitoring circuit, and wherein an error detection signal and/or deactivation signal is triggered when differences exceeding a predetermined limit value occur.

20. The method as claimed in claim 17, wherein partwords are produced in the monitoring circuit and put together to complete words.

21. The method as claimed in claim 20, wherein the partwords are generated in the monitoring circuit irrespective of each other according to different algorithms.

22. The method as claimed in claim 17, wherein the partwords and data word sequences are produced in the data processing systems by programming the data processing systems and are produced in the monitoring circuit by hard-wired electronic circuits.

23. Circuitry as claimed in claim 17, wherein the monitoring circuit is configured as a hard-wired logic circuit capable of producing the partwords on the basis of different algorithms, of joining the partwords to complete data words and comparing them with the individual words of the data word sequence produced in the data processing systems.

24. A method of monitoring a data processing circuit which includes at least two data processing systems, which are mounted on a joint chip and connected by data lines, wherein the data processing systems jointly produces data words and a data word sequence which are transmitted at predetermined times to a monitoring circuit that is mounted on a separate chip, and are checked by the monitoring circuit with respect to the contents and time of appearance of the individual data words, wherein the circuitry includes two integrated circuits, mounted on one joint chip, each circuit representing a complete data processing system and being interconnected by data lines, the circuitry being capable of producing one partword in each of the two data processing systems, wherein one of the two data processing systems is capable of joining the partwords and the other data processing system govern the transmission of the complete data word to a monitoring circuit.

25. The method as claimed in claim 24, wherein the partwords are produced according to different algorithms in the data processing systems.

26. The method as claimed in claim 24, wherein the individual words of the data word sequence are checked for correlation with respect to contents and time with words generated in the monitoring circuit, and wherein an error detection signal and/or deactivation signal is triggered when differences exceeding a predetermined limit value occur.

27. The method as claimed in claim 24, wherein partwords are produced in the monitoring circuit and put together to complete words.

28. The method as claimed in claim 27, wherein the partwords are generated in the monitoring circuit irrespective of each other according to different algorithms.

29. The method as claimed in claim 24, wherein the partwords and data word sequences are produced in the data processing systems by programming the data processing systems and are produced in the monitoring circuit by hard-wired electronic circuits.

30. The method as claimed in claim 24, wherein the individual data words of the word sequences have a length of 8 bit and are composed of two partwords of equal length each.

31. The method as claimed in claim 30, wherein, in the monitoring circuit and by means of the data processing systems, one of the partwords is produced according to the relation $WD_{n+1}(3)$ from $WD_n(2)$ $WD_{n+1}(2)$ from $WD_n(1)$ $WD_{n+1}(1)$ from $WD_n(0)$ $WD_{n+1}(0)$ from $[WD_{n-1}(3)$ XOR $WD_n(1)]$ XOR $WD_n(0)$ And the other partword is produced according to the relation $WD_{n+1}(3)$ from $WD_n(2)$ $WD_{n+1}(2)$ from $WD_n(1)$ $WD_{n+1}(1)$ from $WD_n(0)$ $WD_{n+1}(0)$ from $WD_n(3)$ XOR $WD_n(2)$ wherein (0 . . . 3) . . . is the respective place of the 4-bit partword, n . . . is the point of time in the working clock, XOR . . . is the logic linking "exclusive OR", and From . . . Implies "results from".

32. Circuitry as claimed in claim 24, wherein the monitoring circuit is configured as a hard-wired logic circuit capable of producing the partwords on the basis of different algorithms, of joining the partwords to complete data words and comparing them with the individual words of the data word sequence produced in the data processing systems.

* * * * *